No. 849,055. PATENTED APR. 2, 1907
E. B. CRAM.
TYPE WRITER CARRIAGE.
APPLICATION FILED APR. 27, 1904.
6 SHEETS—SHEET 1.
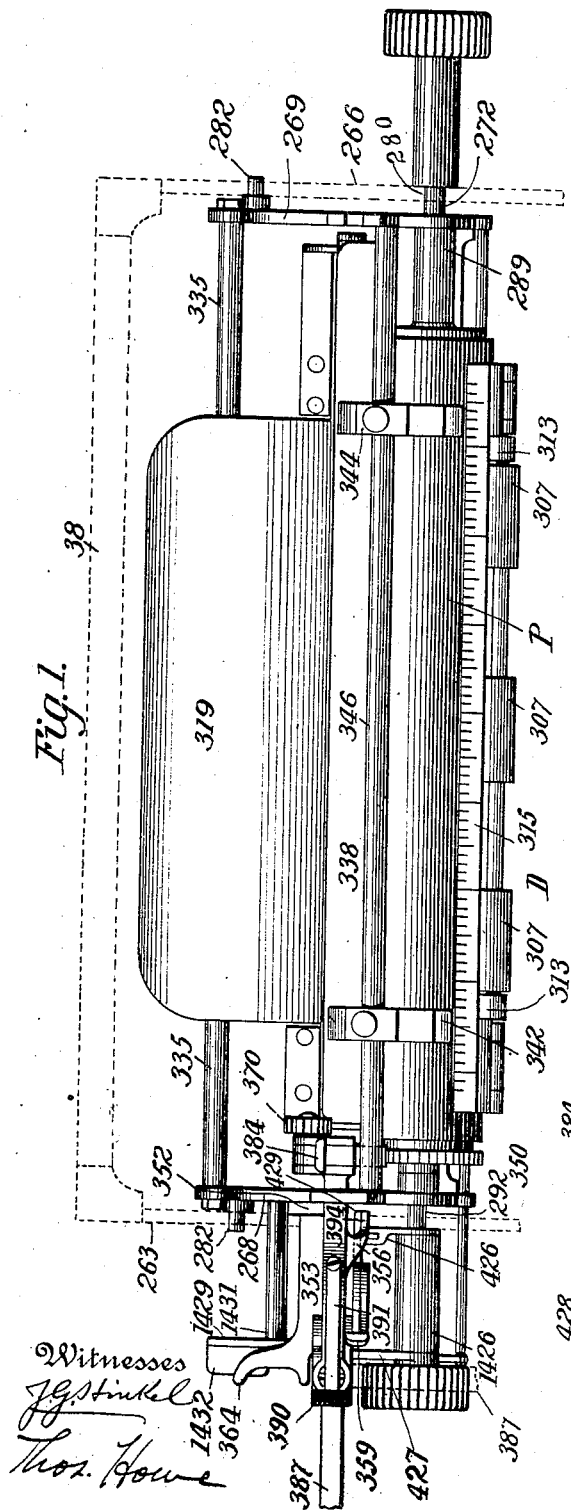
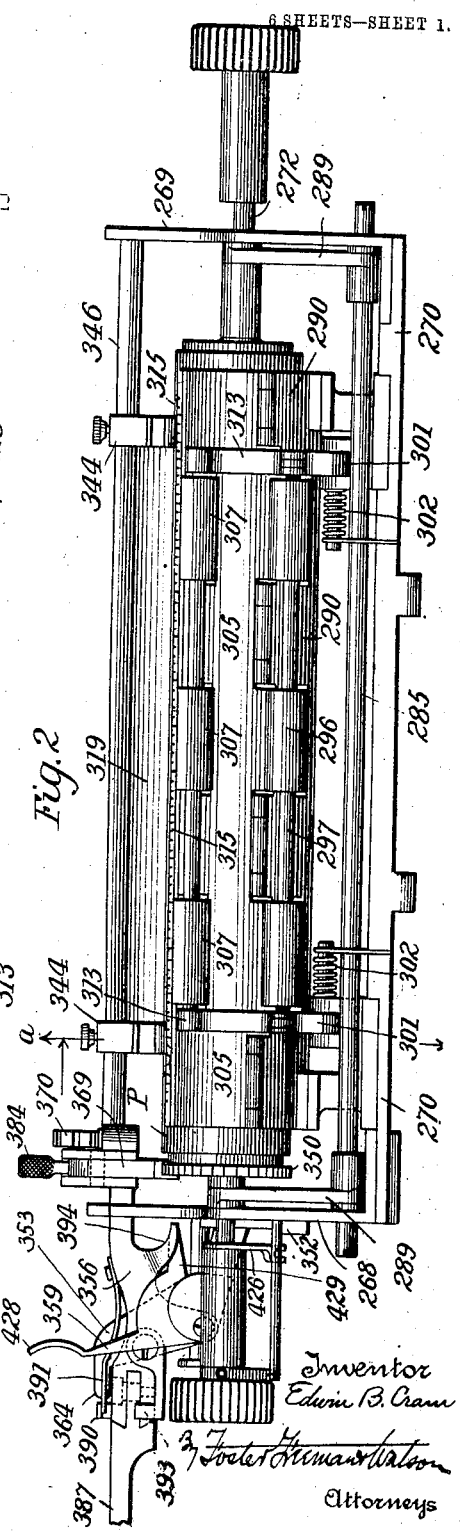

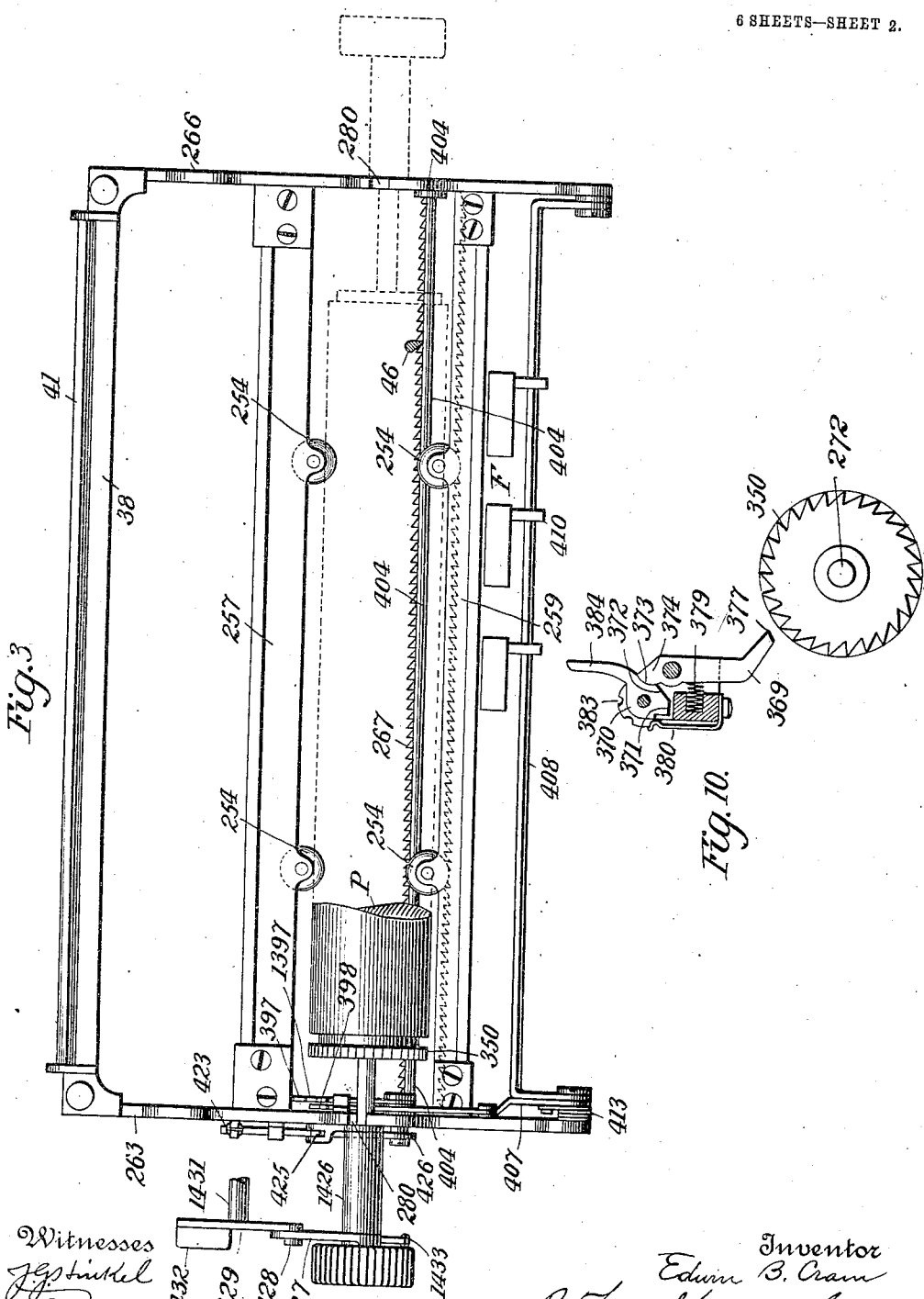

No. 849,055. PATENTED APR. 2, 1907.
E. B. CRAM.
TYPE WRITER CARRIAGE.
APPLICATION FILED APR. 27, 1904.

6 SHEETS—SHEET 3.

Witnesses
J. G. Stinkel
Thos. Howe

Inventor
Edwin B. Cram
By Foster Freeman
& Watson
Attorneys

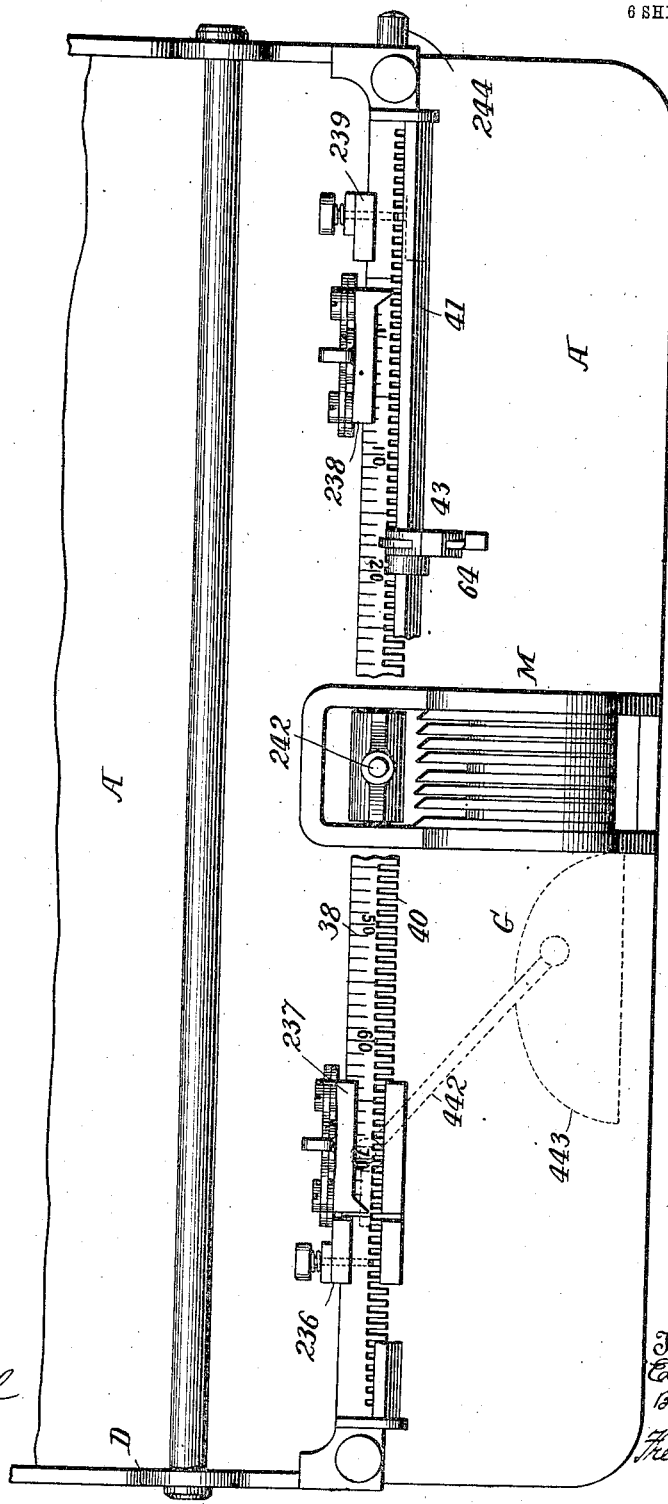

No. 849,055. PATENTED APR. 2, 1907.
E. B. CRAM.
TYPE WRITER CARRIAGE.
APPLICATION FILED APR. 27, 1904.
6 SHEETS—SHEET 5.
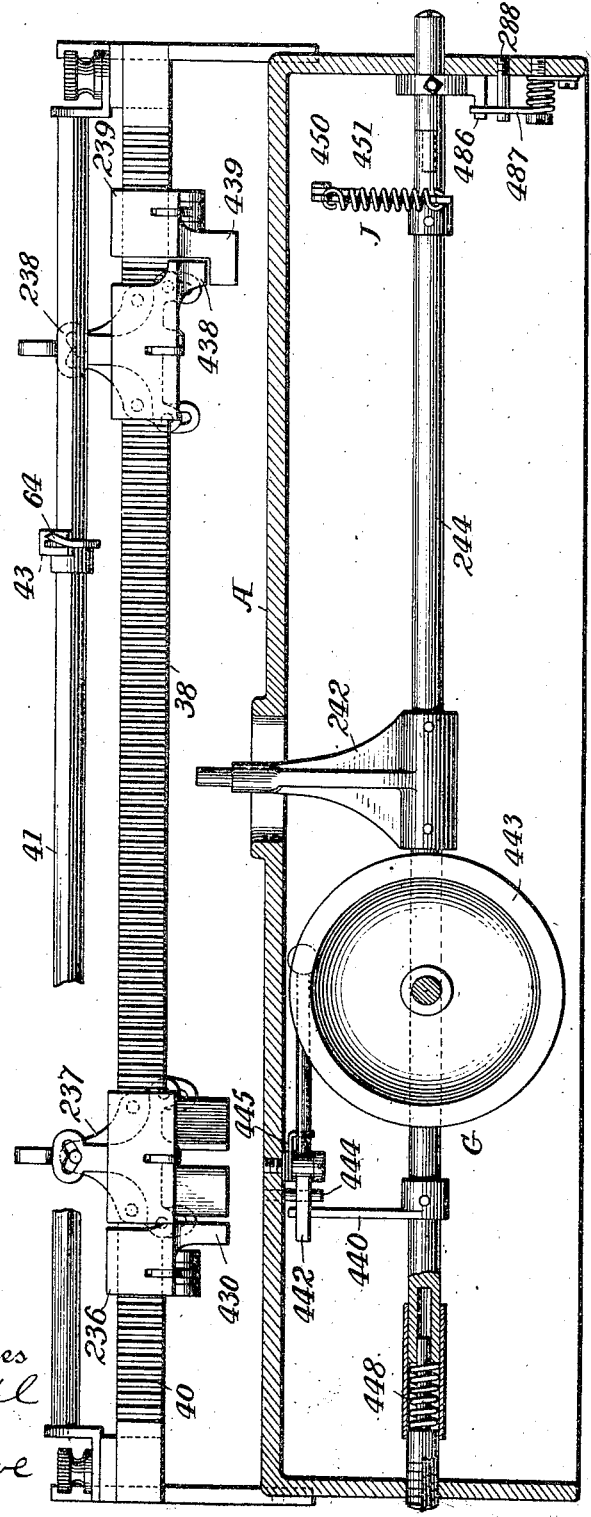
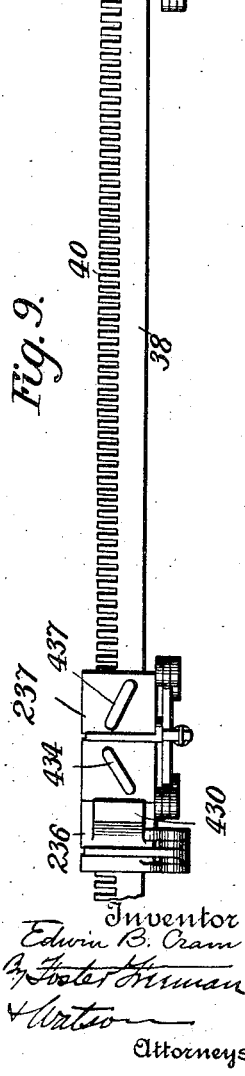

No. 849,055. PATENTED APR. 2, 1907.
E. B. CRAM.
TYPE WRITER CARRIAGE.
APPLICATION FILED APR. 27, 1904.

6 SHEETS—SHEET 6.

Witnesses
J. G. Hinkel
Thos. Howe

Inventor
Edwin B. Cram
by Foster Freeman
and Watson
Attorneys.

# UNITED STATES PATENT OFFICE.

EDWIN B. CRAM, OF BROOKLYN, NEW YORK, ASSIGNOR TO NEW YORK ADDING TYPEWRITER COMPANY, OF ORANGE, NEW JERSEY, A CORPORATION OF MISSOURI.

TYPE-WRITER CARRIAGE.

No. 849,055.　　　Specification of Letters Patent.　　　Patented April 2, 1907.

Application filed April 27, 1904. Serial No. 205,205.

*To all whom it may concern:*

Be it known that I, EDWIN B. CRAM, a citizen of the United States, residing at Brooklyn, in the county of Kings and State of New York, have invented certain new and useful Improvements in Type-Writer Carriages, of which the following is a specification.

This invention relates to carriages for type-writers and mechanism coöperating therewith, and has for its object the provision of improvements as will be hereinafter set forth.

Figure 4:
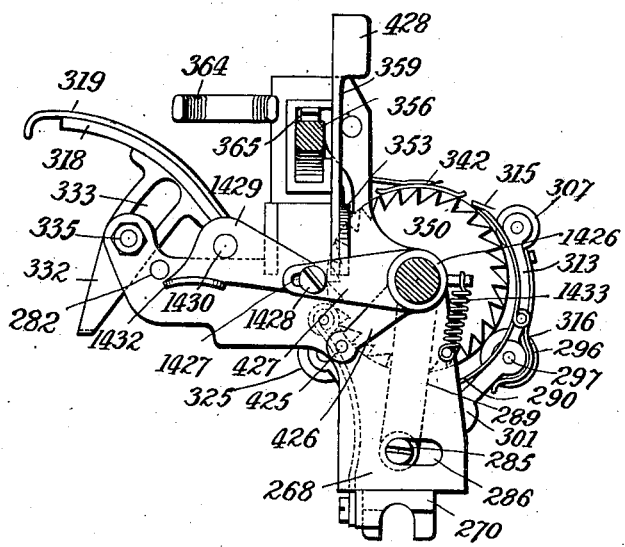
Figure 5:
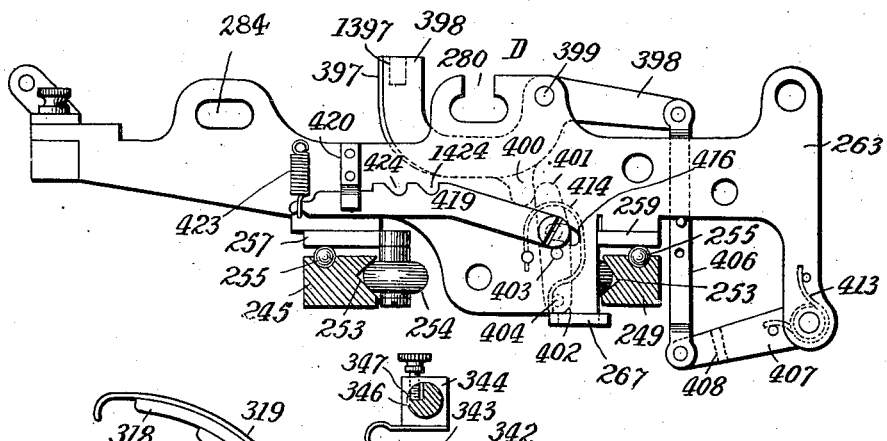
Figure 6:
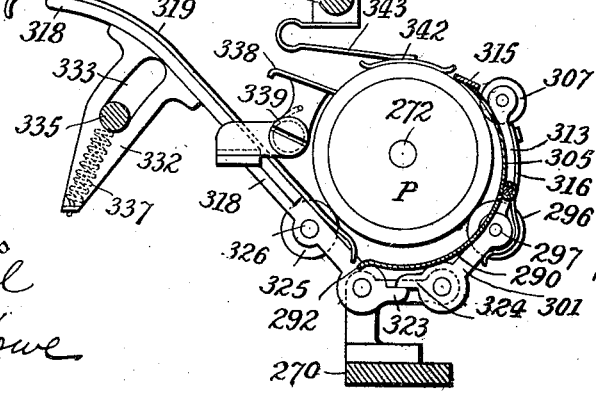
Figure 11:
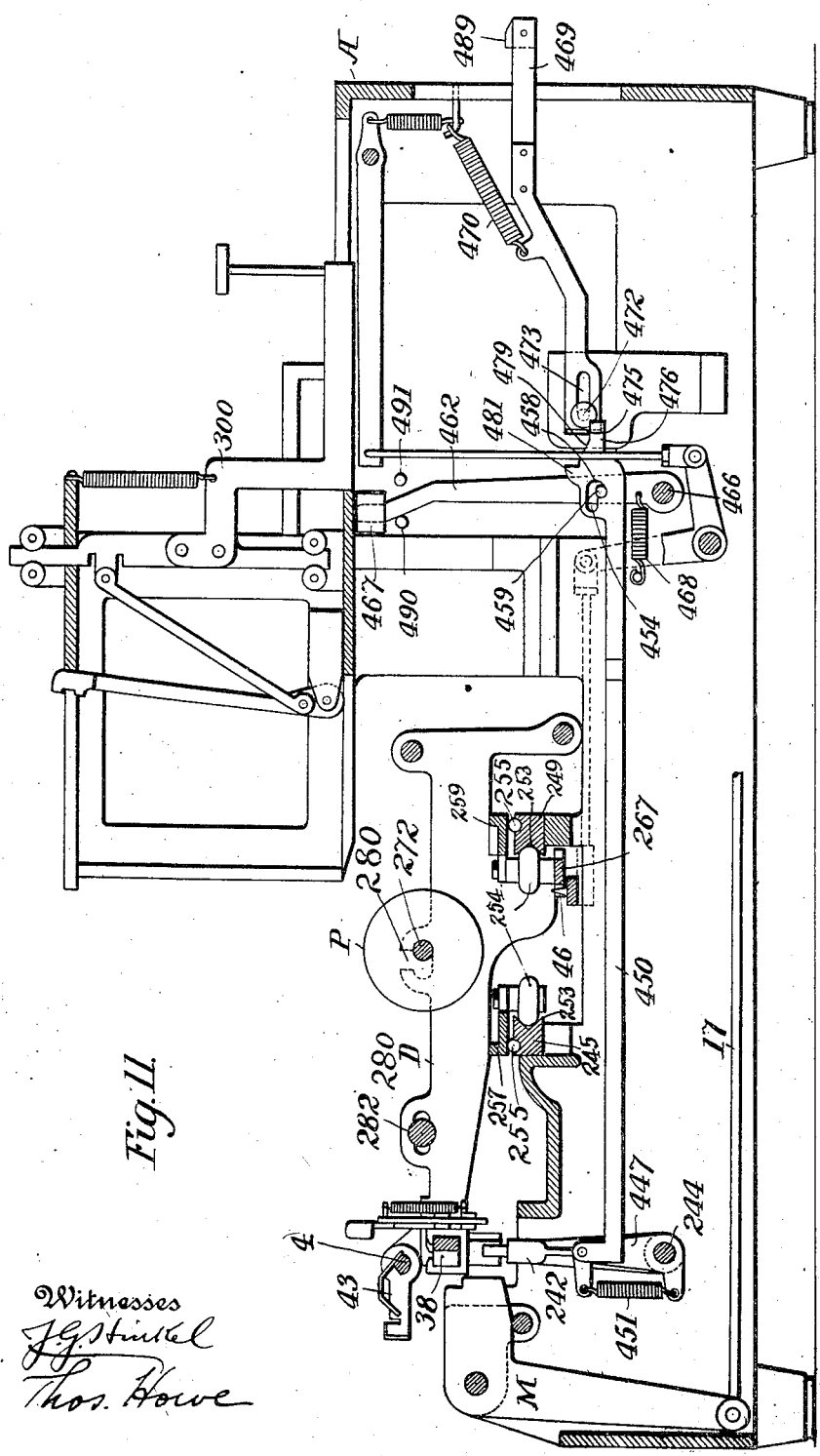

In the accompanying drawings, Figure 1 is a plan of the subcarriage. Fig. 2 is a side elevation of the subcarriage. Fig. 3 is a plan of the main carriage. Fig. 4 is an end elevation of the subcarriage. Fig. 5 is an end elevation of the main carriage. Fig. 6 is a vertical section on the line *a b* of Fig. 2. Fig. 7 is a top plan view of the rear of the machine, showing the stop devices. Fig. 8 is a rear elevation, partly in section, of the machine. Fig. 9 is a bottom plan view of the marginal stops and their supporting-bar. Fig. 10 is an end view of the platen, showing in detail the line-space ratchet-wheel and its coöperating pawl and mechanism; and Fig. 11 is a vertical section of the machine.

The frame A of the machine supports a transversely-movable carriage D, carrying a paper-platen P, adding mechanism F, and a subcarriage which supports the paper-feed devices and the line-spacing mechanism. The carriage D also carries adjustable tabulating-stops 43 and adjustable marginal stops 236, 237, 238, and 239, the former engaging with members M, movable into the paths of the stops 43 by keys at the front of the machine, and suitable connecting mechanism—for instance, as described in my application, Serial No. 188,554, filed January 11, 1904—and the latter engaging with an arm 242, fixed to a rock-shaft 244, turning in the frame A, for actuating an alarm G for indicating the approach of the end of a line and also operating a line-locking mechanism J.

The transverse rails 245 and 249, fixed to the frame A, have lateral grooves 253 for receiving rollers 254, carried by the carriage, whereby the carriage is held against all movement relative to the frame A, except longitudinally of said guide-rails. On the tops of the said rails balls 255 are seated in recesses, on which the bars 257 and 259 of the carriage bear, thereby rendering the carriage more stable and relieving the rollers 254 of practically all of the weight. The carriage ends 263 and 266 are fixed to the bars 257 and 259. The usual carriage-feed rack 267 is also secured to the carriage ends and acts as a stay for the carriage. The subcarriage comprises the end plates 268 and 269, fixed to the ends of the base-piece 270. The shaft 272 of the platen P extends loosely through the ends of the subcarriage, so that this carriage is suspended thereby, enters longitudinal slots 280 in the main-carriage ends, and is supported by the main carriage by means of arms 289, in the ends of which the platen-shaft is journaled and which are fixed to a bar 285, which extends through the slots 286 in the end plates of the subcarriage and is pivotally supported in the main-carriage ends. The holes 286 permit free movement of the subcarriage, so that the bar 285 does not limit it in any way.

The rear ends of the subcarriage end plates have projections 282 entering slots 284 in the main-carriage ends to guide and steady the subcarriage. The slots 280 and 284 permit the movement of the subcarriage and platen between the upper-case and lower-case positions, and the movement is limited by the platen-shaft and the projections 282 coming against the ends of these slots. The shifting between the positions may be accomplished by any suitable means. Washers are placed on the bar 285, the platen-shaft, and the projections 282 between the ends of the main carriage and those of the subcarriage to properly space them and distribute end shocks.

Fixed to the base-piece 270 is a curved paper-guide plate 290, having its inner surface concentric with the surface of the platen. The rear edge 292 of the plate has a short curve which stiffens the plate and prevents the edge of the paper from catching in passing on to the plate. The forward edge of the plate has apertures through which rolls 296 extend and impinge against the platen, the forward edge of said plate being turned outwardly in a short curve, as in the case of the rear edge.

The rolls are rotatably mounted on a shaft 297, which is supported by arms 301, hinged to the base-piece 270 and having springs 302, which force the arms and rolls toward the platen. The arms 301 have projections 324 beyond their hinges for a purpose that will be hereinafter set forth.

Hinged to the paper-guide plate 290 is another guide-plate 305, having apertures for allowing rolls 307 to come in contact with the platen. The rolls 307 are rotatably supported by arms 313, connected to the arms 301 by knuckle-joints which permit lost motion, whereby the arms 301 may be moved some distance without moving the arms 313. Rigidly secured to the upper edge of the plate 305 is a scale 315 for gaging the position of the paper. Springs 316 are fixed to the arms 313, their free ends bearing upon the arms 301.

On the opposite side of the platen from the guide-plates 290 and 305 is a frame 318, carrying a paper-shelf 319. The frame is pivoted to the subcarriage and has at each end projections 323, which extend beneath the projections 324 on the arms 301, supporting feed-rolls 296. The paper-shelf has apertures to permit rolls 325, journaled on a shaft 326, fixed in the frame 318, to come in contact with the platen, the shelf having a short curve where it meets the edge of the plate 290 for reasons stated in description of that plate. Projections 332 are fixed to the frame 318 at each end and have closed slots 333, in which works a rod 335, fixed in the subcarriage end plates, whereby the frame is guided and limited in its movement. Springs 337 are secured to the projections 332 and to the rod 335, whereby the paper-shelf and rolls 325 are forced toward the platen.

A paper-guide shelf 338 for receiving and guiding the paper upwardly as it leaves the platen extends the length of the platen and is so supported by the frame 318 that it may rock into and out of contact with the platen, against which it is normally pressed by springs 339.

Upon each end of the platen bears a paper-clamp 342, which is fixed to a spring 343, which is in turn fixed to a block 344, rotatably mounted on a shaft 346, supported by the subcarriage end plates. The shaft 346 has a notch 347, and by means of screws carried by the blocks, located to the rear of the centers of the blocks and engaging with a wall of the notch, the tension of the springs 343 can be regulated. The ends of the clamps overhang the scale slightly, so that the paper in leaving the platen must pass under the clamps. To place a sheet of paper in the machine, its edge is inserted between the rolls 325 and the platen, and the latter is turned in the usual manner, thus forcing the paper forward. In its course the paper is guided by the paper-shelf 319, passes over the rolls 325, is guided by the paper-guide plate 290, passes between the rolls 296 and the platen, is guided by the upper paper-guide plate 305, passes under the rolls 307, the scale, and the paper-clamps 342, one of which bears upon each lateral margin of the paper, and is finally discharged upon the paper-guide shelf 338.

If it is desired to adjust the paper in the machine, the paper is grasped between the thumb and forefinger of each hand, the little fingers resting upon the paper-shelf 319. This operates to depress the paper-shelf and its supporting-frame, and with it the rolls 325. Further depression of the frame causes the projections 323 to move upwardly and by coöperation with the projections 324 causes the arms 301 and rolls 297 to move outwardly. Further downward movement of the paper-shelf 319 causes the lost motion in the joints between the arms 301 and 313 to be taken up and the two sets of arms to move outwardly together, thus moving the rolls 307 outwardly. The paper may now be adjusted by a gentle pull in the proper direction, and upon the release of the pressure upon the paper-shelf the rolls and guide-plates will return to position to secure the sheet without disturbing its adjustment.

Secured to the platen is the usual line-space ratchet-wheel 350, forming part of the line-space mechanism, which with its coöperating devices will now be described.

A projection 352 from the left-hand side of the subcarriage has an arm 353, which projects over the adjacent main-carriage end. On said arm is pivoted a line-space lever 356 and the carrying-levers restoring lever 359. The arm 353 is curved or inclined upwardly and formed at its free end into a finger-piece 364 for use in moving the carriage transversely of the machine. The lever 356 works in a closed slot 365 in the subcarriage end plate and is guided and limited in its movement thereby, a suitable spring normally pressing it against the top end of the slot. The inner end of the lever 356 overhangs the ratchet-wheel 350 and has a groove in which is pivoted a pawl 369, adapted to engage with the ratchet-wheel, and a cam 370 for regulating the paper-feed, having faces 371, 372, and 373 for engagement with the tail 374 of the pawl, which faces are located at different distances from the pivotal point of the cam, and therefore hold the pawl-point 377 at different distances above the ratchet-wheel, and thereby determine different points at which the pawl engages the ratchet-wheel. The tail 374 is spring-pressed against the cam-faces by a spring 379. The cam is held in its various positions by a spring 380, secured to the lever 356 and engaging with notches 383 in the cam corresponding to the cam-faces. A finger-piece 384 is fixed to the cam for use in positioning it.

The outer end of the lever 356 is forked, and in such fork is pivoted the arm 387 for returning the carriage, having a hand part at its outer end, so that it may turn horizontally to fold against the side of the machine, as shown in dotted lines in Fig. 1, so that it will occupy less space when not in use. A clip 390 is spring-supported on the lever 356 and has vertical portions extending beside the joint between the lever 356 and the arm 387 when the latter is extended, so that the joint is made rigid when the clip is in its upper position, as it is normally held by its spring 391. By pressure upon the top of the clip it can be moved downwardly until the vertical portion 393 is out of the path of the arm 387, when the arm can be turned about its pivot.

On the side of the lever 356 is a projection 394, adapted to bear in its depressed position upon the ends of levers 397 and 398. The lever 397 is pivoted at 399 in the main-carriage end and has a projection 400 for engaging with the extension 401 of an arm 402, pivoted to the main-carriage end at 403, to the lower end of which one end of a rod 404 is connected. The rod 404 runs the length of the carriage and at its other end is connected to a similar arm, which is pivoted to the other main-carriage end. The rod 404 passes in proximity to the feed-dog 46, which is normally engaged with the rack 267 and is disengaged therefrom to release the carriage by a rearward movement of the rod 404, such as would be caused by a depression of the free end of the lever 397. Normally the rod 404 is held in forward position by a spring 414. The lever 398 is pivoted at 399 in the carriage end, and pivoted to said lever is a link 406, that is also pivotally connected to an arm 407, which supports one end of a transverse bail 408 and is pivoted to the main-carriage end. The bail 408 extends across the carriage in proximity to the "carrying-levers" 410 of adding mechanism F, and its other end is pivoted upon the other main-carriage end. The adding mechanism may be of any desired and suitable style, and is therefore merely conventionally or diagrammatically illustrated. The raising of the bail 408, effected by pressure upon the end of the lever 398, restores the carrying-levers 410—that is, moves them to their normal position. The bail is normally maintained in depressed position by gravity or suitable springs 413.

The restoring-lever 359 has a thumb-piece 428 and a tail 429, which is adapted when depressed and the platen is in the lower-case position to strike the end of the lever 398, so that said lever will be operated to restore the carrying-levers, the tail 429 entering a slot 1397 in the lever 397, so that the last lever is not disturbed. In the upper-case position the tail 429 is carried beyond both the lever ends 398 and 397 and is therefore inoperative.

To explain the operation of the line-spacing mechanism and its allied devices, let it be assumed that the arm 387 is held rigidly in extended position, as shown by the full lines of the drawings. To move the carriage to the right, the hand of the operator is placed on the hand part and a pressure toward the right and upwardly is exerted. The upward pressure operates to throw the projection 394 downwardly upon the ends of the levers 397 and 398, thus releasing the carriage and restoring the carrying-levers as before described, while the pressure to the right returns the carriage to its right-hand position to begin a new line. In addition to these operations the upward movement of the arm 387 causes the pawl 369 to move downwardly into engagement with the ratchet-wheel and the platen to be moved to space for a new line. The line-spacing is adjusted by means of the cam 370 in a manner as before described. The pawl always moves through the same distance, which is limited by lever 356 coming against the ends of the slot 365 in the subcarriage end plate, and the movement of the platen is determined by fixing the point at which the pawl engages the ratchet-wheel, as before described, after which the wheel will move with the pawl to the end of its travel.

If it is desired to restore the adding-levers without affecting the line-spacing and coöperating mechanisms, it can be accomplished by pressing upon the thumb-piece 428 of the restoring-lever 359, when the restoring will take place as before described.

Fixed to the extension 401 of the arm 402 is a pin extending through a slot 416 in the main-carriage end, to which is pivoted an arm 419, pressed against a guide 420, fixed to the main-carriage end by a spring 423, and having in its upper face notches 424 and 1424 for receiving a pin 425 in an arm 426, fixed to a sleeve 1426 upon the platen-shaft, the sleeve having an arm 427 near the platen-handle. The arm 427 has a slot 1427 in which works a pin 1428, fixed in a lever 1429, pivoted at 1430 upon the projection 1431 from the subcarriage and having a thumb-piece 1432. The pin 425 is normally held out of slots 424 and 1424 by a spring 1433, so that the movement of the platen is unhampered thereby. By upward pressure upon the thumb-piece 1432 the pin 425 is thrown into one of the notches 424 and 1424, according to the position of the platen, (upper or lower case,) and continued pressure operates through the arm 419 to release the carriage, the spring 423 permitting the arm 419 to yield sufficiently to allow the desired movement of the arm 426.

Fixed to the rear of the main-carriage ends is a bar 38, having grooves 40 upon its rear face, and a bar 41, having two flat sides at an angle to each other. Upon the bar 38 are mounted adjustable marginal stops 236, 237, 238, and 239, and upon the rod 41 are mounted tabulating-stops 43, which slide and move freely thereon and are held in and out of operative position by springs 64, fixed to the stops and engaging with the flat sides of the rod. When in operative position, the stops 43 engage with the grooves 40 and are thereby held against lateral movement, and when inoperative they extend horizontally. The marginal stops may be moved along their bar 38 and are held in position by any suitable means. Projecting downwardly from the bottom of the stop 236 is a projection 430, standing transverse to the carriage movement. Similarly, the stop 237 has oppositely-disposed cam projections 434 and 437, the stop 238 has a projection 438 transverse to the carriage movement, but extending across only about one-half the width of the bar 38 and having its right-hand face transverse to the carriage movement and its left-hand face at an angle thereto, and the stop 239 has a projection 439 transverse to the carriage movement.

In the path of the projections from the marginal stops as the carriage moves back and forth is the end of the arm 242, which abuts against certain of the projections to limit the movement of the carriage and is cammed back and forth by others, thereby rocking the shaft 244 and operating the line-locking mechanism and alarm mechanism connected thereto.

The alarm mechanism comprises an arm 440, fixed to the shaft 244 and extending into proximity with and forwardly of the tail of the clapper 442 of a bell 443, supported by the frame A, which clapper is normally pressed close to the bell with its tail against the fixed pin 444 by the spring 445. When the arm 440 is moved rearwardly, it moves the clapper away from the bell against the spring 445, which upon the release of the arm moves the arm to normal position and brings the clapper in contact with the bell.

When the arm 440 is moved forwardly, a projection 486, fixed to the shaft 244, comes against the tail of a spring 487, supported by the frame A, which tail is normally against the fixed pin 488. Thus the shaft is returned to normal position by the spring 487 or 445, but when in normal position is free from the pressure of either.

A suitably-arranged buffer-spring 448 takes up the shock when the carriage-stop strikes the arm 242 upon the restoring of the carriage to the right to begin a new line.

The line-locking mechanism has for its object to prevent the feed of the carriage beyond a certain point and to prevent the type from being operated to write one character on another after that limit has been reached and comprises an arm 447, fixed to the shaft 244, to which arm is pivoted a lever 450, the forward end of which is normally held elevated by the spring 451. In the forward end of the lever 450 is a slot 454, having a notch 458 at its front portion for engaging a pin 459, fixed in an arm 462 of a pair, one at each side of the machine, which are fixed to a rock-shaft 466, journaled in the frame A, and carry the bail 467, movable into and out of the path of key-stems 300, whereby the depression of the keys and the operation of their coöperating mechanisms is prevented. The bail is normally held from under the key-stems by a retracting-spring 468 and is moved beneath them by the rocking of the shaft 244 when the arm 447 is moved forwardly. The movement of the bail is limited by fixed stop-pins 490 and 491. To provide a means for manually removing the bail 467 from under the key-stems when it has been moved thereunder by the arm 447, a plunger 469, retracted by spring 470, is slidably supported by the frame A and a pin 472 supported by the frame, which pin works in a slot 473 in the plunger. At its front end the plunger extends beyond the front of the machine and carries the pivoted catch 489, adapted to engage the front of the frame A; and at its rear end carries the projection 475, adapted to engage with a projection 476, a cam-face 479, and a shoulder 481 upon the forward end of the lever 450.

By pressing the plunger until the catch comes against the front of the machine-frame the projection 475 will ride upon the cam-face 479, thereby depressing the lever 450, so that the pin 459 will be freed from the notch 458, and the bail 467 will move from beneath the key-levers under the influence of the spring 468. By depressing the catch and still further pressing the plunger the projection 475 will come against the shoulder 481, and thus rock the arm 242 backwardly to avoid a stop upon the carriage, the utility of which will be hereinafter set forth.

To explain the operation of the line-lock and alarm mechanisms and their coöperating devices, suppose that a line is nearly completed. The stops 236 and 237, which are adjusted to any desired distance apart, approach the arm 242, and as the arm is engaged by the rear face of the left-hand cam projection upon the stop 237 it is thrown to the rear, thereby sounding the alarm, as described. After the projection 237 has passed arm 242 the arm is returned to normal position, and further movement of the carriage causes engagement between the front face of the right-hand projection and said arm, whereby the arm is rocked forwardly, thereby moving the locking-bail 467 beneath the key-stems. This marks the end of a line, and further operation is prevented, as the type-bars cannot be operated and the carriage cannot be fed. It may be, however, that it is desired to write further, as to make marginal notes, &c. This can be accomplished by pressing in the plunger 469 until it is stopped by the catch 489, when the bail will be removed from beneath the key-stems, as described, and the writing may proceed until the transverse face of the projection from the stop 236 comes against the arm 242. The limit of operation on the right of the paper having been reached, the carriage is restored to the right, as described, until the transverse face of the projection from the stop 238 collides with the arm 242, the shock being taken up by the spring 488. This marks the beginning of a line; but if it be desired to write in the left-hand margin the catch 489 is depressed and the plunger is pressed in so that the projection 475 comes against the shoulder 481, and thereby forces the arm 242 to the rear, when the carriage can be moved to the right, the arm 242 passing behind the projection on the stop 238 until it is arrested by the contact of the arm 242 with the transverse projection upon the stop 239. Writing may now proceed in the margin in the usual manner, and the beginning of a normal line is indicated by the striking of the bell, which is caused by the rearward camming of the arm 242 by the left-hand face of the projection from the stop 238.

Without limiting myself to the precise construction and arrangement of parts shown, I claim—

1. In a type-writer, the combination with a carriage and operating-keys, of a lever adapted to be rocked by the carriage at any desired point in its travel, means for preventing operation of the keys including a pin-and-slot connection with said lever, a notch or recess being formed in a side wall of the slot and normally receiving the pin, a spring tending to hold the key-locking devices in inoperative position and adapted to be put under tension by the engagement, through such pin and notch, of said lever and key-locking devices, and means for withdrawing the pin of such connection from said notch.

2. In a type-writer, the combination with a carriage and operating-keys, of a pivotally-mounted bail movable to and from a position to prevent operation of the keys, a spring acting to hold said bail in inoperative position, a lever adapted to be rocked by the carriage and having a slot formed therein, and provided with a notch in one of its side walls, a pin connected with the key-locking bail and extending into said slot, and normally fitting in said notch to connect said pin and lever to cause the latter to move the key-locking bail to operative position, and means for releasing said pin from said notch and thereby allowing it to move freely in the slot in the lever at will.

3. In a type-writer, the combination with a carriage and operating-keys, of a pivotally-mounted bail movable to and from a position to prevent operation of the keys, a spring acting to hold said bail in inoperative position, a lever adapted to be rocked by the carriage and having a slot formed therein, a pin connected with the key-locking bail and extending into said slot, means for connecting said pin and lever to cause the latter to move the key-locking bail to operative position, and a release-key movable longitudinally of said lever and adapted to rock the same to release the pin connected with the key-locking bail therefrom.

4. In a type-writer, the combination with a carriage, of a stop device for the carriage, keys, locking means for preventing operation of the keys, means controlled by the carriage for operating said locking means, and means adapted to release said locking means by a limited movement and on a further movement to release the carriage from said locking means, substantially as described.

5. In a type-writer, the combination with key-stems, of a bail movable into and out of the path of said stems, a pin connected to said bail, an operating-lever having a slot in which said pin works, said slot having a notch at one end adapted to receive said pin, a cam, a plunger coöperating with said cam to release said pin from said notch, and means tending to move said bail out of the path of said stems, substantially as described.

6. In a type-writer, the combination with a carriage, of a stop thereon, a rock-shaft, an arm thereon adapted to engage with said stop, a lever, secured to said rock-shaft, having a shoulder and a cam, key-stems, a bail movable into and out of the path of said stems, a pin-and-slot connection between said bail and said lever, the slot having a notch at one end to receive the pin and a plunger which, when depressed, engages said cam to remove said pin from said notch and then comes against said shoulder, thereby releasing said carriage from said stop device, substantially as described.

7. In a type-writer, the combination with a carriage and operating-keys, of means for preventing operation of the keys, a rock-shaft having an arm adapted to be engaged by a projection on the carriage to limit the travel of the latter, connections between said shaft and the key-locking means, whereby when the shaft is rocked by a suitable projection on the carriage the key-locking means will be moved to operative position, and a release-key adapted to disconnect the rock-shaft and key-locking means by a limited movement and, by a further movement, to actuate the rock-shaft to withdraw the arm thereon from the path of its coöperating projection on the carriage.

8. In a type-writer, the combination with a carriage and operating-keys, of means for preventing operation of the keys, a rock-shaft having an arm adapted to be engaged by a projection on the carriage to limit the travel of the latter, connections between said shaft and the key-locking means, whereby when the shaft is rocked by a suitable projection on the carriage the key-locking means will be moved to operative position, and a release-key adapted to disconnect the rock-shaft and key-locking means without actuating said shaft.

9. In a type-writer, the combination with a carriage and operating-keys, of means for preventing operation of the keys, a rock-shaft having a projection adapted to be engaged by means connected with the carriage to limit the travel of the latter, a lever fulcrumed on said shaft and connected with the key-locking devices, whereby when said shaft is rocked by a suitable projection moving with the carriage said lever will move the key-locking devices to operative position, and a release-key adapted to rock said lever about its fulcrum to disconnect the key-locking devices therefrom by a limited movement and, by a continued movement, to actuate the rock-shaft to withdraw the carriage-locking projection thereon from operative position.

10. In a type-writer, the combination with means for preventing operation of the keys, means for sounding an alarm to indicate the approach to the end of a line, and a common rock-shaft for operating both said line-lock and alarm mechanisms, of means for rocking said shaft in one direction to actuate the line-lock mechanism and in the opposite direction to actuate the alarm mechanism.

11. In a type-writer, the combination with means for preventing operation of the keys, and means for sounding an alarm to indicate the approach to the end of a line, of a rock-shaft, two oppositely-inclined cams connected with the carriage and adapted to successively rock said shaft in opposite directions, and connections between said shaft and both the line-lock mechanism and the alarm mechanism, the parts being so arranged that when the shaft is rocked by one of said cams the alarm mechanism is operated and when said shaft is rocked by the other cam the line-lock mechanism is actuated.

12. In a type-writer, the combination with key-stems, of locking means for preventing the operation of said stems, an alarm for indicating the approach of the end of a line, a carriage, a rock-shaft connected to said locking means and said alarm, an arm on said rock-shaft and means carried by said carriage for moving said arm back and forth, said alarm and locking means being so related to said arm that when it is rocked in one direction the alarm will be operated and when rocked in the other direction said locking means will be moved into operative position, substantially as described.

13. In a type-writer, the combination with key-stems, of locking means for preventing the operation of the keys, an alarm for indicating the approach of the end of a line, a rock-shaft so connected to said alarm and said locking means that when it is rocked in one direction said alarm will be operated and when rocked in the other direction said locking means will be thrown into operative position and means operated by the carriage for rocking said shaft, substantially as described.

14. In a type-writer, the combination with means for preventing operation of the keys, and means for sounding an alarm to indicate the approach to the end of a line, of a rock-shaft, means for successively rocking said shaft in opposite directions as the carriage approaches the end of its travel, and connections between said shaft and both the alarm mechanism and the line-lock mechanism, so arranged that when the shaft is rocked in one direction the alarm mechanism will be operated and when the shaft is rocked in the other direction the line-lock mechanism will be actuated.

15. In a type-writer, the combination with means for preventing operation of the keys, and means for sounding an alarm to indicate the approach to the end of a line, of a rock-shaft, an arm extending radially from said shaft, means on the carriage for successively engaging said arm and rocking the shaft in opposite directions, and connections between said shaft and both the alarm mechanism and the line-lock mechanism whereby when the shaft is rocked in one direction the alarm mechanism will be operated and when the shaft is rocked in the opposite direction the line-lock mechanism will be actuated.

16. In a type-writer, the combination with a main carriage having horizontal slots formed in its ends, of a platen, a shaft therefor supported by said main carriage and a subcarriage supported by said shaft and having projections extending into said slots, substantially as described.

17. In a type-writer, the combination with a main carriage comprising end plates, a feed-rack and bars constituting bearings for said carriage, said rack and bars being secured to said end plates, of a subcarriage carried by said main carriage, movable with relation thereto and mounted between the end plates of said main carriage, substantially as described.

18. In a type-writer, the combination with a main carriage comprising end plates, a feed-rack and bars constituting bearings for said carriage, said rack and bars being secured to said end plates, of a subcarriage carried by said main carriage, movable with relation thereto and mounted between the end plates of said main carriage, said subcarriage comprising end plates and a base-piece connected thereto, substantially as described.

19. In a type-writer, the combination with a main carriage comprising end plates, a feed-rack and bars constituting bearings for said carriage, said rack and bars being fixed to said end plates, of a platen, a shaft therefor, arms pivoted to said carriage and supporting said shaft and a subcarriage supported by said platen-shaft within the ends of said main carriage, substantially as described.

In testimony whereof I have signed my name to this specification in the presence of two subscribing witnesses.

EDWIN B. CRAM.

Witnesses:
  W. F. CARTER,
  WALTER N. DAVIS.